(12) United States Patent
Edelman et al.

(10) Patent No.: US 10,789,744 B2
(45) Date of Patent: Sep. 29, 2020

(54) METHOD AND APPARATUS FOR AUGMENTED REALITY DISPLAY ON VEHICLE WINDSCREEN

(71) Applicant: Topcon Positioning Systems, Inc., Livermore, CA (US)

(72) Inventors: Leonid Valerianovich Edelman, Moscow (RU); Daniele Pagliani, Turin (IT)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 15/577,044

(22) PCT Filed: Apr. 4, 2016

(86) PCT No.: PCT/RU2016/000186
§ 371 (c)(1),
(2) Date: Nov. 27, 2017

(87) PCT Pub. No.: WO2017/176143
PCT Pub. Date: Oct. 12, 2017

(65) Prior Publication Data
US 2018/0144523 A1     May 24, 2018

(51) Int. Cl.
*G06T 11/60*    (2006.01)
*G02B 27/01*   (2006.01)
(Continued)

(52) U.S. Cl.
CPC .............. *G06T 11/60* (2013.01); *B60K 35/00* (2013.01); *B60W 40/02* (2013.01);
(Continued)

(58) Field of Classification Search
None
See application file for complete search history.

(56) References Cited

U.S. PATENT DOCUMENTS 9,794,638 B2 * 10/2017 Jo ..................... H04N 21/4884
2007/0010925 A1    1/2007 Yokoyama et al.
(Continued)

FOREIGN PATENT DOCUMENTS

DE    112013006256 T5    10/2015
JP         2002146846 A     5/2002
(Continued)

OTHER PUBLICATIONS

International Search Report and Written Opinion dated Jan. 26, 2017, in connection with International Patent Application No. PCT/RU2016/000186, 5 pgs.
(Continued)

*Primary Examiner* — Jwalant Amin
(74) *Attorney, Agent, or Firm* — Chiesa Shahinian & Giantomasi PC

(57) ABSTRACT

A method for providing a machine operator with an augmented reality view of an environment includes determining a location and orientation of a vehicle. An eye position and gaze of an operator of the vehicle are also determined. Job information to be displayed to the operator of the vehicle is determined based on the location of the vehicle and the orientation of the vehicle. The job information is displayed to the operator based on the eye position and gaze of the operator of the vehicle. In one embodiment, environmental features that can be seen through the windscreen are determined. The job information displayed to the operator is modified based on the environmental features.

6 Claims, 5 Drawing Sheets

(51) Int. Cl.
  *G06F 3/01* (2006.01)
  *B60W 40/02* (2006.01)
  *G02B 27/00* (2006.01)
  *B60K 35/00* (2006.01)
  *E02F 3/00* (2006.01)

(52) U.S. Cl.
  CPC ......... *G02B 27/0093* (2013.01); *G02B 27/01* (2013.01); *G02B 27/0101* (2013.01); *G02B 27/0179* (2013.01); *G06F 3/011* (2013.01); *G06F 3/013* (2013.01); *B60K 2370/155* (2019.05); *B60K 2370/16* (2019.05); *B60K 2370/18* (2019.05); *B60K 2370/334* (2019.05); *B60K 2370/52* (2019.05); *E02F 3/00* (2013.01); *G02B 2027/014* (2013.01); *G02B 2027/0138* (2013.01); *G02B 2027/0141* (2013.01); *G02B 2027/0187* (2013.01)

(56) References Cited

U.S. PATENT DOCUMENTS

| | | | | |
|---|---|---|---|---|
| 2008/0262669 | A1* | 10/2008 | Smid | G05D 1/0278 701/23 |
| 2009/0058678 | A1* | 3/2009 | Matsuoka | B60Q 9/008 340/904 |
| 2009/0091475 | A1 | 4/2009 | Watanabe et al. | |
| 2013/0158778 | A1* | 6/2013 | Tengler | G08G 1/096716 701/31.5 |
| 2014/0240313 | A1 | 8/2014 | Varga | |
| 2014/0362195 | A1* | 12/2014 | Ng-Thow-Hing | G06K 9/00791 348/51 |
| 2016/0004305 | A1 | 1/2016 | Pagliani et al. | |
| 2016/0193920 | A1 | 7/2016 | Tsubone et al. | |

FOREIGN PATENT DOCUMENTS

| | | |
|---|---|---|
| JP | 2010-018141 A | 1/2010 |
| WO | 2005024144 A1 | 3/2005 |
| WO | 2005121707 A2 | 12/2005 |

OTHER PUBLICATIONS

Extended Search Report dated Oct. 16, 2019, in connection with European Patent Application Serial No. 16898061.3, 10 pgs.

Notification of Reasons of Refusal dated May 26, 2020, in connection with Japanese Patent Application No. 2018-550676, filed Apr. 4, 2018, 9 pgs (including English translation).

* cited by examiner

METHOD AND APPARATUS FOR AUGMENTED REALITY DISPLAY ON VEHICLE WINDSCREEN

CROSS-REFERENCE TO RELATED APPLICATIONS

This application is a national stage (under 35 U.S.C. 371) of International Patent Application No. PCT/RU2016/000186, filed Apr. 4, 2016, which is herein incorporated by reference in its entirety.

BACKGROUND

The present disclosure relates generally to an augmented reality (AR) display, and more particularly to an AR display for a construction vehicle windscreen.

Augmented reality is the integration of information with an environment perceived by a user. Augmented reality can be implemented using a window through which a user can view an environment. For example, a projector can be used to project information onto the window. The information can overlay certain objects that the user can see through the window. The information can be displayed in an opaque, transparent, or semi-transparent manner. Augmented reality can be used with a vehicle to provide additional information to a user by projecting the information onto the vehicle's windscreen (also referred to as windshield). For example, information about the vehicle's speed, compass heading, etc. can be projected onto the vehicles windscreen to provide the user with a heads-up display (HUD). Use of a HUD allows the operator of the vehicle to continuously view the environment through the vehicle's windscreen by allowing the user to view information on the windscreen rather than the vehicle's instrument panel.

Augmented reality displays provide additional information to a user about vehicle parameters and existing objects that can be seen through a window on which additional information is displayed.

SUMMARY

In one embodiment, a method for providing a machine operator with an augmented reality view of an environment includes determining a location and orientation of a vehicle. An eye position and gaze of an operator of the vehicle are also determined. Job information to be displayed to the operator of the vehicle is determined based on the location of the vehicle and the orientation of the vehicle. The job information is displayed to the operator based on the eye position and gaze of the operator of the vehicle. In one embodiment, environmental features that can be seen through the windscreen are determined. The identification and display of job information are further based on the determination of environmental features. In one embodiment, the determination of environmental features is based on detection of objects located in the environment in which the vehicle is located. Job information can include construction parameters, agricultural operations, and/or surface modification parameters. In one embodiment, a particular job is identified by operator input and identification of job information is further based on the operator input. In one embodiment, the display of job information comprises displaying an attribute image pertaining to job information overlaying an environmental feature based on the eye position and gaze of the operator. A location for the attribute image can be determined based on data from the environment awareness device.

DETAILED DESCRIPTION

Augmented reality is used to provide an operator of a vehicle (e.g., a machine such as a construction machine) with information concerning a job to be performed and additional information. In one embodiment, the operator of a vehicle is provided with a heads-up display (HUD) on a windscreen (also referred to as a windshield) of the vehicle. The HUD provides the operator with information concerning a job, such as surface modification, structure construction, surface construction, etc. In one embodiment, the information displayed to the operator is based on a location and orientation of the machine. The information displayed by the HUD can be used by the machine operator to operate the machine in order to perform a job. For example, an operator can be provided with a virtual boundary of an area designated for excavation displayed on the windscreen. The virtual boundary of the area is displayed to the operator based on a location and gaze of the operator's eyes in order to align the real view through the windscreen with the information displayed on the windscreen. This allows the operator to view virtual information aligned with real objects and locations seen through the windscreen. If the location of the operator's eyes and the gaze of the operator are not taken into account when displaying virtual images, the virtual images may not align with real objects and locations seen through the windscreen. In one embodiment, the HUD provides the operator with information about a particular area with respect to desired structures and surfaces that don't currently exist. Multiple devices are used to provide an augmented reality view to the machine operator.

Figure 1:
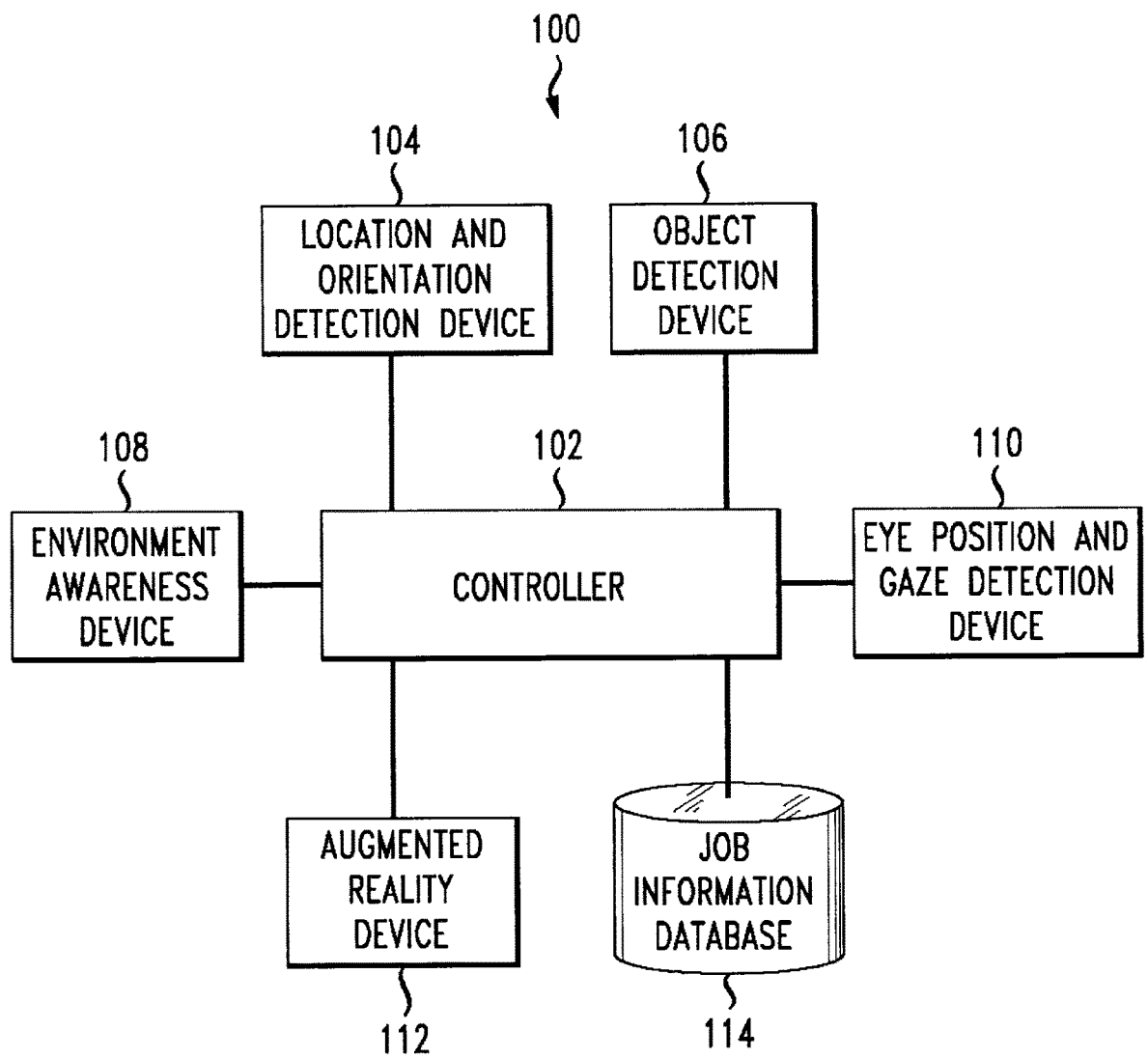
FIG. 1 depicts a system for providing an augmented reality display to an operator of a machine.

FIG. 1 depicts a system 100 for an augmented reality display on a vehicle windscreen. Location and orientation detection device 104, in one embodiment, is one or more devices used to determine a location and orientation of an associated machine on which device 104 is located. A global navigation satellite system (GNSS) receiver can be used to determine a location of the machine. The GNSS receiver (also referred to as a global positioning system (GPS) receiver) can also be used to determine an orientation of the machine. For example, GNSS data pertaining to movement of the machine in conjunction with knowledge of how the machine is capable of moving can be used to determine an orientation of the machine. In one embodiment, a GNSS receiver can be used to determine a location of a machine and another device can be used to determine an orientation of the machine.

An inertial measurement unit (IMU) can be used to determine an orientation of a machine. An IMU can be mounted or otherwise located on the machine. The IMU measures acceleration of the machine in order to determine movement and an orientation of the machine. For example, if a starting orientation of a machine is known, the IMU can measure acceleration of the machine in different directions in order to determine a current orientation of the machine based on the starting orientation and acceleration of the machine in one or more directions. An IMU can also be used to determine a location of the machine if a starting location is known. For example, if a forward acceleration is detected by the IMU, this acceleration can be used to determine that a machine is moving forward at a particular speed. The current location of the machine can be determined based on the direction the machine is travelling and how long the machine has been travelling at the particular speed.

A laser tracking unit, optical tracking unit, and/or stereo camera can also be used to determine a location and/or orientation of a machine. In addition, a combination of devices, such as a GNSS receiver and an IMU, can be used to determine a location and position of a machine. Other combinations of devices can be used as well.

Object detection device 106 is used to detect objects and obstacles in an area in which a machine is located. In one embodiment, object detection device 106 includes one or more sensors for monitoring the area in which the machine is located. The object detection device can use any type of hardware such as a sonic transceiver, a laser transceiver, an optical sensing device (e.g., camera or stereo camera), radar transceiver, etc. Any type of sensor or device, or combination of sensors and/or devices, that can detect objects and obstacles in an area in which the machine is located can be used.

Environment awareness device 108 is used to determine placement of additional information displayed to the user so that the information does not interfere with real objects that the operator needs to see. In one embodiment, environment awareness device 108 includes an object detection device that is used to detect objects and obstacles in an area in which a machine is located. In one embodiment, the object detection device of environment awareness device 108 is separate from object detection device 106. In one embodiment, the environment awareness device uses data obtained by object detection device 106. Information pertaining to objects located in the area in which the machine is located is then used to determine placement of additional information for display to an operator of the machine so that real objects are not hidden by additional information displayed via the machine's windscreen.

Eye position and gaze detection device 110 is used to determine a position of an operator's eyes and the direction of the operator's gaze. In one embodiment, the position of the operator's eyes is determined with respect to the windscreen. For example, the operator's eyes can be located centered with respect to the windscreen. The position of the operator's eyes changes with movement of the operator's head. For example, an operator may lean left or right, thereby changing the position of the operator's eyes with respect to the windscreen. The gaze of the operator is where the operator is looking. For example, the operator can be looking forward, left, right, up, or down. The eye position and gaze direction of the operator are used to position an image projected on a windscreen of a machine so that additional information is arranged with respect to real objects that can be seen through the windscreen. For example, an image of a lead line pointing to an object can be displayed on the windscreen so that the lead line points to the object based on the eye position and gaze direction of the operator. In one embodiment, eye position and gaze detection device 110 comprises a stereo camera but can comprise any device, or group of devices, capable of detecting an operator's eye position and gaze direction.

Augmented reality device 112 is a device used to display information to a machine operator. In one embodiment, augmented reality device 112 comprises a projector for projecting an image onto a windscreen of a machine in which augmented reality device 112 is located. Augmented reality device 112 can project an image onto a transparent film that is attached to the windscreen. In one embodiment, augmented reality device 112 can adjust the luminosity and contrast of an image displayed on the windscreen in order to promote viewing of the image and visibility of the real world on the outside of the windscreen. The luminosity and/or contrast of the displayed image can also be adjusted to prevent discomfort of the operator. Adjustment of the luminosity and/or contrast of the image displayed can be automatic or user controlled.

Job information database 114 is used to store information pertaining to a job that requires use of a machine. Job information database 114 can also store information related to an environment in which the machine is located. For example, information concerning an excavation is stored in job information database 114 along with information pertaining to the location (e.g., environment) in which the excavation to be performed. Job information database 114 can be accessed in order to obtain information used in generating and displaying information to a machine operator.

Location and orientation detection device 104, object detection device 106, environment awareness device 108, eye position and gaze detection device 110, augmented reality device 112, and job information database 114 are each in communication with controller 102. Controller 102, in one embodiment, is a processor for receiving data from various devices, accessing job information database 114, and outputting data to augmented reality device 112 to cause an image to be displayed to an operator of an associated machine. In one embodiment, controller 102, location and orientation detection device 104, object detection device 106, environment awareness device 108, eye position and gaze detection device 110, augmented reality device 112, and job information database 114 are physically located on a machine, such as a construction machine. Controller 102 can include peripherals, such as a keyboard, cursor controller (e.g., a mouse) and a display (not shown) to allow a user to interact with controller 102. Controller 102 can communicate one or more of the components shown in FIG. 1 via a wired and/or wireless network. In one embodiment, one or more devices can be located remote from the machine. For example, job information database 114 can be located remote from controller 102 and data can be transmitted and received between the two components. In one embodiment, data is transmitted between job information database 114 and controller 102 wirelessly. With respect to the location and orientation detection device, one or more components of this device can be located remote from the machine on which controller 102 is located.

Figure 2:
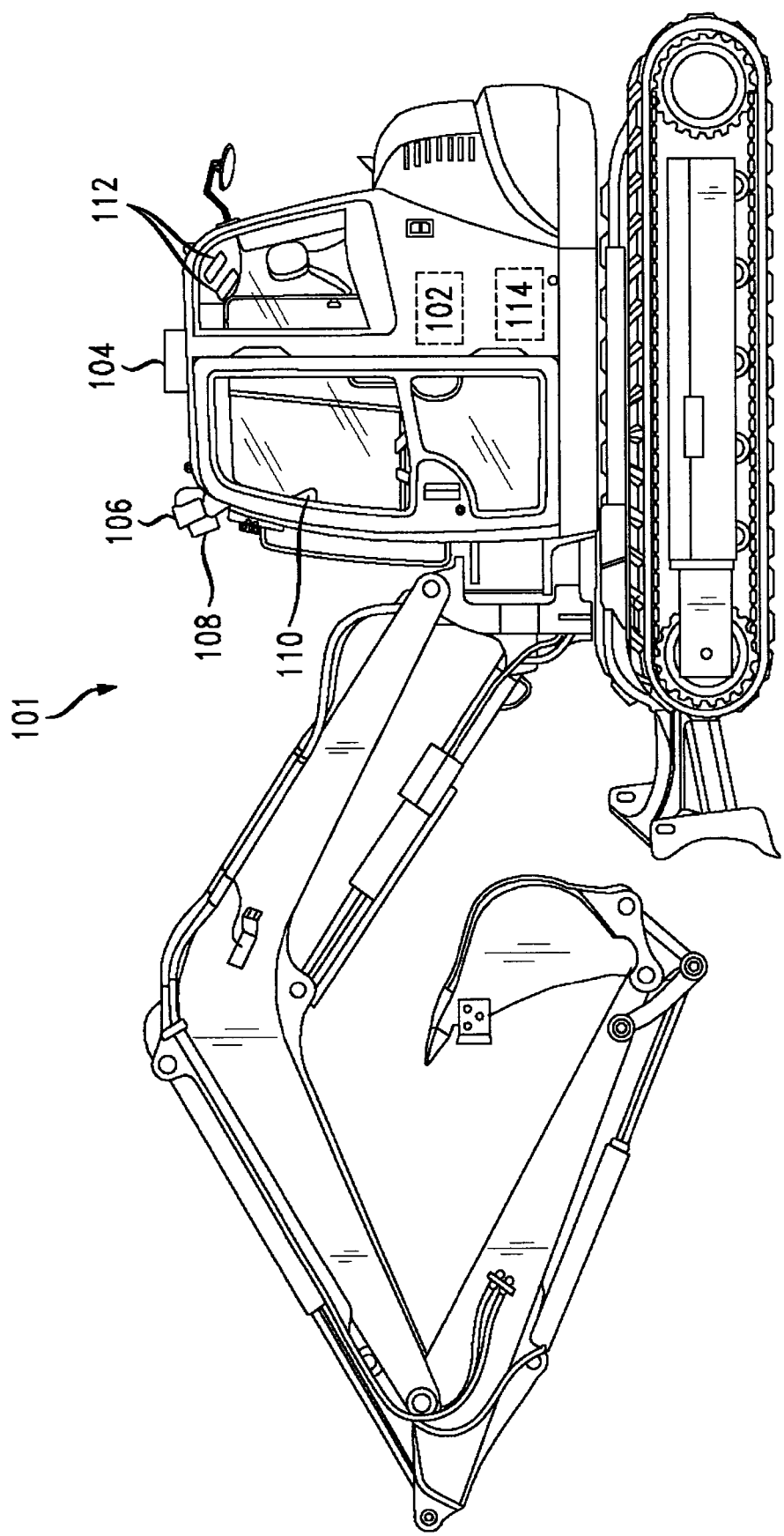
FIG. 2 depicts a machine equipped with an augmented reality display and associated components.

FIG. 2 depicts a machine 101 equipped with an augmented reality system and related components. Controller 102, eye position and gaze detection device 110, augmented reality device 112, and job information database 114, in this embodiment, are shown located in a cab of machine 101. Location and orientation device 104, object detection device 106, and environment awareness device 108, in this embodiment, are shown located on the roof of the cab of machine 101.

Figure 3:
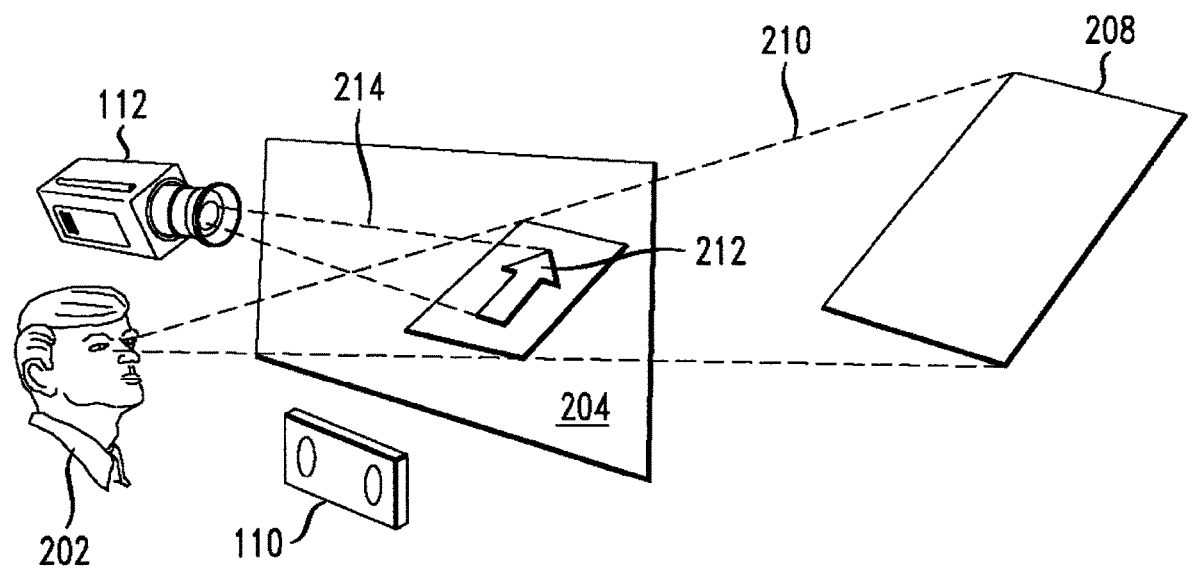
FIG. 3 depicts a schematic of an augmented reality system for displaying an image to an operator of a machine.

FIG. 3 depicts a schematic of an augmented reality system for displaying an image to an operator of machine 101. Specifically, FIG. 3 depicts windscreen 204 of machine 101 in which some components of system 100 are located. Operator 202 is shown located in the cab of the machine and viewing environmental feature 208 through windscreen 204. Controller 102 (shown in FIGS. 1 and 2) is in communication with eye position and gaze detection device 110 and augmented reality device 112. Based on data from location and orientation device 104 and object detection device 106, controller 102 determines attribute image 212 to be displayed to operator 202. The placement of attribute image 212, in one embodiment, is determined based on information pertaining to the environment in which the machine is located and data from eye position and gaze detection device 110, environment awareness device 108, and job information database 114. Data from environment awareness device 108 is used to determine placement of attribute image 212 so that it does not interfere with parts of the environment that operator 202 needs to see, such as obstacles or structures.

In FIG. 3, attribute image 212 is displayed to operator 202 by augmented reality device 112 projecting the attribute image 212 onto windscreen 204. Attribute image 212, in this example, is an arrow indicating an operation to be performed by operator 202 using the machine in which the operator is located. Attribute image 212 is projected onto windscreen 204 in a particular location as shown by projection lines 214. The particular location of windscreen 204 on which attribute image 212 is displayed is based on an eye position and gaze of operator 202 in order to align attribute image 212 with the view operator 202 has of environmental feature 208 as shown by view lines 210.

The placement of attribute image 212, in one embodiment, is determined based on information from job information database 114 using machine location and orientation information from location and orientation detection device 104. For example, an area requiring excavation can be determined to be near the machine based on machine location. The placement of attribute image 212 can be determined based on machine orientation. If the area to be excavated is currently in view of the operator through the windscreen, attribute image 212 will be displayed based on the eye position and gaze of operator 202. In addition, information from object detection device 106 is used to identify objects in the environment in which the machine is located. The placement of attribute image 212 can be modified based on information from environment awareness device 108 in order to prevent occlusion of objects that operator 202 needs to see.

In one embodiment, placement of attribute image 212 on windscreen 204 (i.e., projection of the attribute image 212 in a particular location on the windscreen 204) is determined using a line intersection method. A line extending from the operator's eye position to an object of interest (e.g., environmental feature 208) in the direction of the operator's gaze is calculated. In one embodiment, the line comprises a plurality of points. The point along the line where the windscreen intersects the line is determined. The attribute image 212 is then placed (e.g., projected) on windscreen 204 aligned with the object of interest with respect to the operator's eye position by aligning the attribute image 212 with the intersection point of the line at windscreen 204. In one embodiment, a geometric center of an image of the object of interest as viewed by the operator is determined and a geometric center of attribute image 212 is located on windscreen 204 at the intersection point. The line can extend from a position of one of the operator's eyes or a midpoint between the operator's eyes. In one embodiment, the midpoint between the operator's eyes is determined prior to calculating the line extending from the midpoint to the object of interest.

Figure 4:
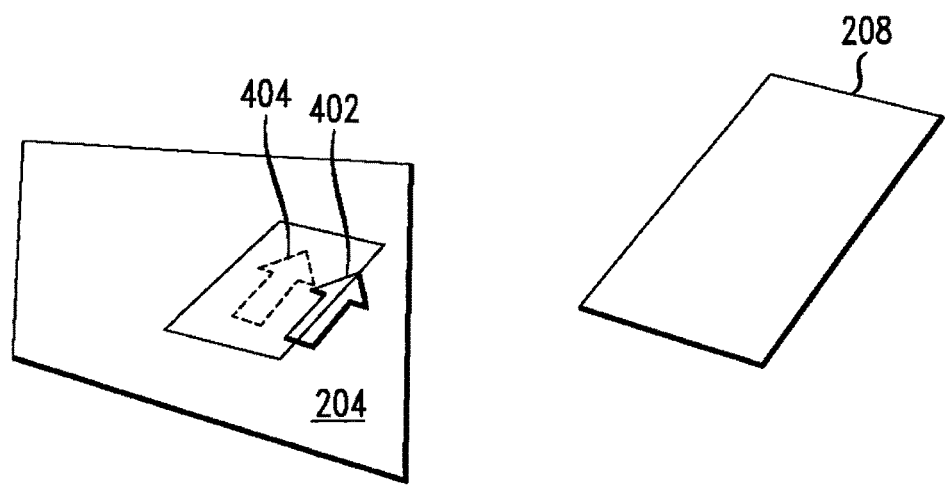
FIG. 4. depicts examples of images displayed on an augmented reality display with and without modification to account for eye position and gaze direction.

FIG. 4 depicts an augmented reality view when operator eye position and location are not used to modify the location of an attribute image. As shown in FIG. 4, the attribute image should be displayed in the location depicted by phantom attribute image 404, but instead is displayed in an incorrect location as shown by the location of attribute image 402. The location of attribute image 402 is not adjusted to account for the operator's eye position and gaze direction. The location of phantom attribute image 404 is where the image would be displayed if the location of the image was modified based on the operator's eye position and gaze direction.

Figure 5:
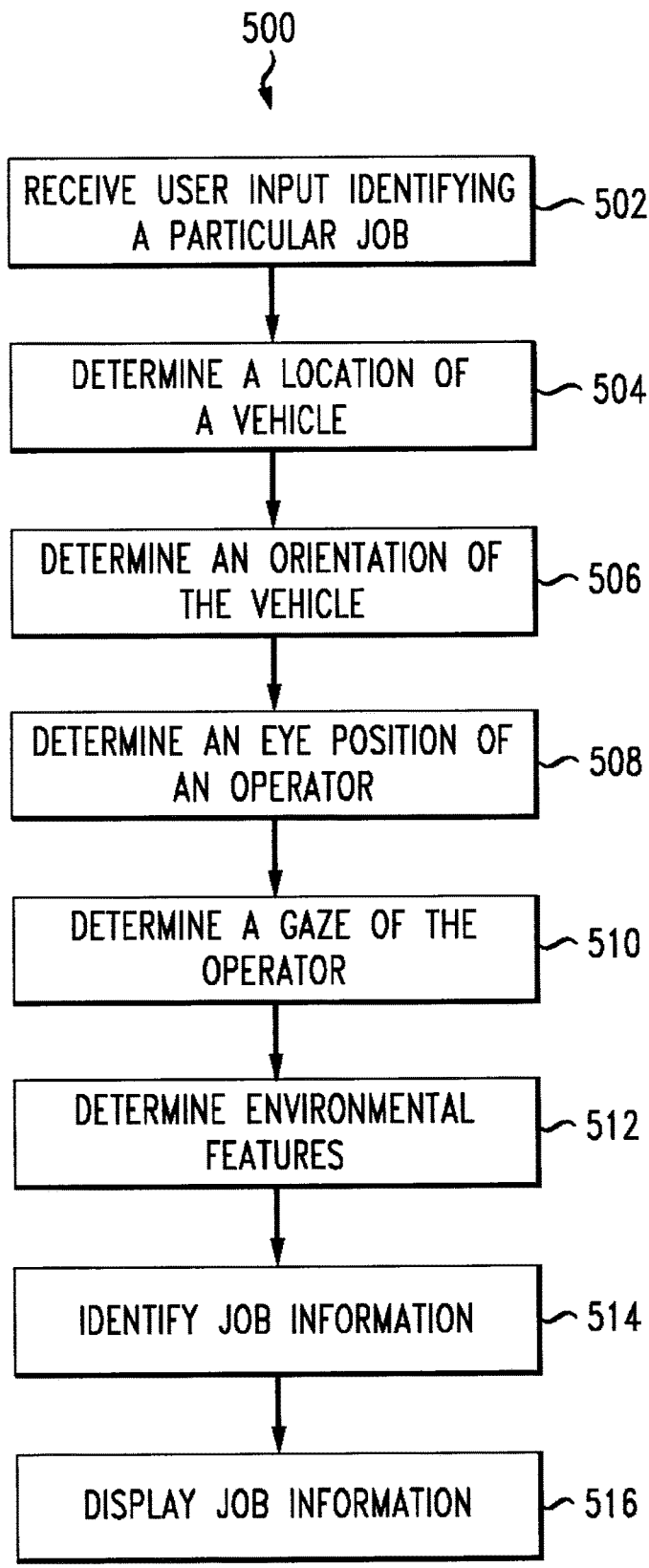
FIG. 5 depicts a flowchart of a method for displaying an image to an operator of a machine according to one embodiment.

FIG. 5 depicts a flow chart of method 500 performed by controller 102 for displaying information to an operator of a machine. At step 502, user input is received by controller 102. In one embodiment, the user input identifies a particular job for which the operator would like information. For example, depending on the type of machine that the operator is using, the operator may want to see excavation information, construction information, etc. At step 504, controller 102 determines a location of the vehicle on which controller 102 is located. At step 506, controller 102 determines an orientation of the vehicle on which controller 102 is located. In one embodiment, location and orientation information is determined based on information received by controller 102 from location and orientation device detection device 104.

At step 508, controller 102 determines an eye position of the operator. At step 510, controller 102 determines a gaze of the operator. In one embodiment, the eye position and gaze of the operator are determined based on information received by controller 102 from eye position and gaze detection device 110.

At step 512, controller 102 determines environmental features of the environment in which the vehicle is located. In one embodiment, controller 102 determines environmental features using information received from object detection device 106. For example, features such as mounds, depressions, equipment, structures, etc., can be detected by object detection device 106. Controller 102 can use the information received pertaining to objects and compare this information to environment data contained in job information database 114. For example, environment data can be used to identify objects detected in the environment in which the vehicle is located.

At step 514, controller 102 identifies job information to be displayed to a user. In one embodiment, job information is identified by controller 102 using information stored in job information database 114. For example, controller 102 can identify the environment in which the vehicle is located using the location and orientation of the vehicle. The particular job information the operator would like to view is determined using the user input from the operator. For example, for an excavation job, an operator of the machine can request and be provided with a display including a virtual boundary of the excavation area and a virtual indication of a required excavation depth. For a job to be performed by a bull dozer, the operator can request and be provided with a display including a virtual boundary of the job site and a virtual cut indication and a virtual fill indication. For a job to be performed by an agricultural tractor, a tractor operator can request and be provided with a virtual map of a seeding or spraying job.

At step 516, the job information identified in step 514 is displayed to the operator. In one embodiment, the job information identified for display is transmitted from controller 102 to augmented reality device 112 which, in one embodiment, projects the information on the vehicle's windscreen.

In one embodiment, job information identified and displayed to the operator comprises one or more attribute images. In one embodiment, each attribute image is associated with an environmental feature. For example, controller 102 can assign an attribute image to an area of the environment that needs to be excavated. In this example, the attribute image comprises an image indicating a depth of excavation required. One or more attribute images can be associated with a particular environmental feature.

In one embodiment, the location an attribute image is displayed on the windscreen can be modified based on the environment in which the vehicle is located. Information about the environment, in one embodiment, is received from environment awareness device 108. For example, if an object in the environment detected by environment awareness device 108 is identified as something the vehicle should not interact with, controller 102 can modify the display of one or more attribute images in order to prevent occlusion or obstruction of the object that should not be interacted with. In one embodiment, a location of an attribute can be designated to prevent occlusion of an object. A luminosity and/or a transparency of an attribute image can also be adjusted to prevent obstruction of an operator's view of an object that should not be interacted with.

Figure 6:
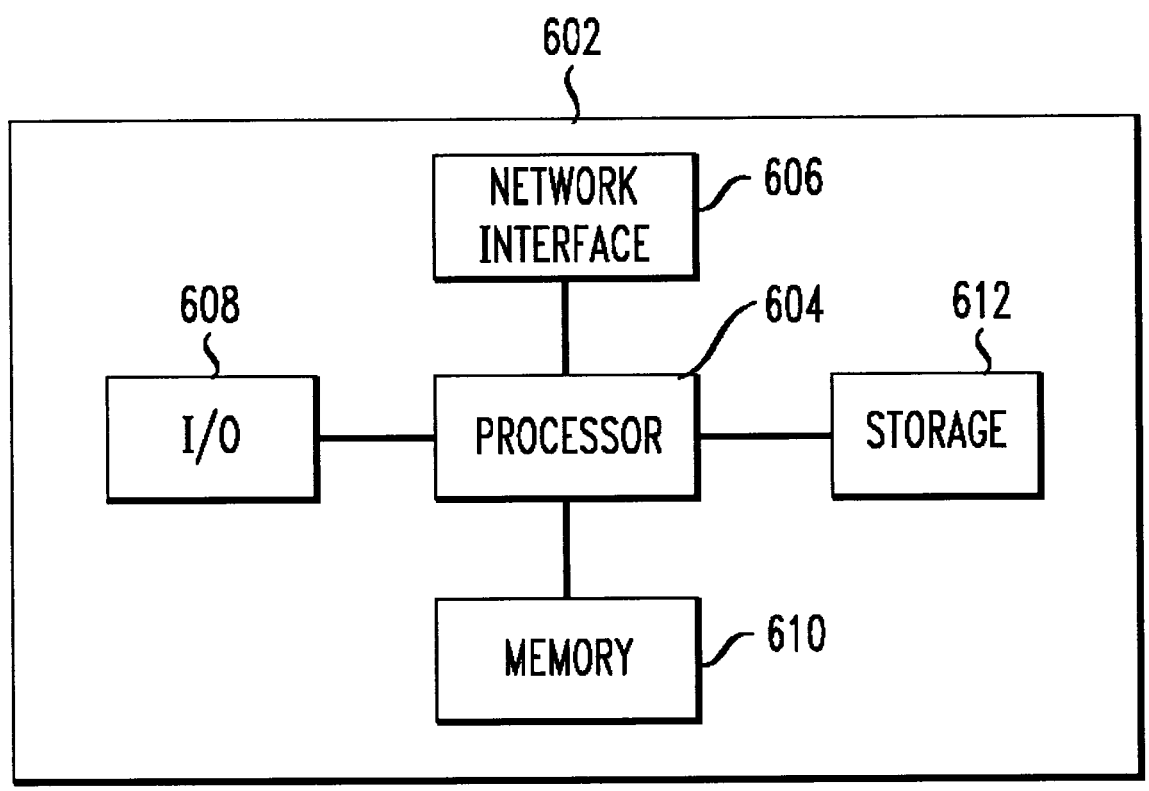
FIG. 6 depicts a high-level block diagram of a computer.

Controller 102, location and orientation detection device 104, object detection device 106, environment awareness device 108, eye position and gaze detection device 110, augmented reality device 112, and job information database 114 can each be implemented using a computer. A high-level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.), and loaded into memory 610 when execution of the computer program instructions is desired. Thus, the method steps of FIG. 5 can be defined by the computer program instructions stored in the memory 610 and/or storage 612 and controlled by the processor 604 executing the computer program instructions. For example, the computer program instructions can be implemented as computer executable code programmed by one skilled in the art to perform an algorithm defined by the method steps of FIG. 5. Accordingly, by executing the computer program instructions, the processor 604 executes an algorithm defined by the method steps of FIG. 5. The computer 602 also includes one or more network interfaces 606 for communicating with other devices via a network. The computer 602 also includes input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
    determining a location of a vehicle;
    determining an orientation of the vehicle;
    determining an eye position of an operator of the vehicle with respect to a windscreen of the vehicle;
    determining a gaze of the operator of the vehicle;
    detecting environmental features and objects located in an environment in which the vehicle is located;
    determining environmental features and objects that are visible through the windscreen of the vehicle based on the detecting;
    identifying job information to be displayed to the operator on the windscreen of the vehicle based on the location of the vehicle, the orientation of the vehicle, and the environmental features and objects, wherein the job information comprises surface modification parameters;
    determining a location for an attribute image to be displayed based on the job information, the location of the vehicle, the orientation of the vehicle, the environmental features and objects located in the environment, and preventing occlusion of an environmental feature or an object associated with the attribute image; and
    displaying the job information including the attribute image to the operator on the windscreen at a luminosity and contrast to promote viewing of the attribute image and visibility of the environmental features and objects that are visible through the windscreen of the vehicle, the displaying based on a line intersection method and the eye position and gaze of the operator of the vehicle.

2. The method of claim 1, further comprising:
    receiving operator input identifying a particular job,
    wherein the identifying job information is further based on the operator input.

3. An apparatus comprising:
    a processor; and
    a memory to store computer program instructions, the computer program instructions when executed on the processor cause the processor to perform operations comprising:
        determining a location of a vehicle;
        determining an orientation of the vehicle;
        determining an eye position of an operator of the vehicle with respect to a windscreen of the vehicle;
        determining a gaze of the operator of the vehicle;
        detecting environmental features and objects located in an environment in which the vehicle is located;
        determining environmental features and objects that are visible through the windscreen of the vehicle based on the detecting;
        identifying job information to be displayed to the operator on the windscreen of the vehicle based on the location of the vehicle, the orientation of the vehicle, and the environmental features, wherein the job information comprises surface modification parameters;

determining a location for an attribute image to be displayed based on the job information, the location of the vehicle, the orientation of the vehicle, the environmental features and objects located in the environment, and preventing occlusion of an environmental feature or an object associated with the attribute image; and displaying the job information including the attribute image to the operator on the windscreen at a luminosity and contrast to promote viewing of the attribute image and visibility of the environmental features and objects that are visible through the windscreen of the vehicle, the displaying based on a line intersection method and the eye position and gaze of the operator of the vehicle.

4. The apparatus of claim 3, the operations further comprising:

receiving operator input identifying a particular job, wherein the identifying job information is further based on the operator input.

5. A non-transitory computer readable medium storing computer program instructions, which, when executed on a processor, cause the processor to perform operations comprising:

determining a location of a vehicle;

determining an orientation of the vehicle;

determining an eye position of an operator of the vehicle with respect to a windscreen of the vehicle;

determining a gaze of the operator of the vehicle;

detecting environmental features and objects located in an environment in which the vehicle is located;

determining environmental features and objects that are visible through the windscreen of the vehicle based on the detecting;

identifying job information to be displayed to the operator on the windscreen of the vehicle based on the location of the vehicle, the orientation of the vehicle, and the environmental features and objects, wherein the job information comprises surface modification parameters;

determining a location for an attribute image to be displayed based on the job information, the location of the vehicle, the orientation of the vehicle, the environmental features and objects located in the environment, and preventing occlusion of an environmental feature or an object associated with the attribute image; and displaying the job information including the attribute image to the operator on the windscreen at a luminosity and contrast to promote viewing of the attribute image and visibility of the environmental features and objects that are visible through the windscreen of the vehicle, the displaying based on a line intersection method and the eye position and gaze of the operator of the vehicle.

6. The non-transitory computer readable medium of claim 5, the operations further comprising:

receiving operator input identifying a particular job, wherein the identifying job information is further based on the operator input.

* * * * *